(12) United States Patent  
Mutz et al.

(10) Patent No.: US 9,910,491 B2  
(45) Date of Patent: Mar. 6, 2018

(54) DEVICE AND METHOD FOR DETECTING THE HANDLING OF AT LEAST ONE OBJECT

(71) Applicant: BLINKSIGHT, Colombelles (FR)

(72) Inventors: Stéphane Mutz, Cuverville (FR); Matthieu Mutz, Caen (FR)

(73) Assignee: BLINKSIGHT (FR)

( * ) Notice: Subject to any disclaimer, the term of this patent is extended or adjusted under 35 U.S.C. 154(b) by 0 days.

(21) Appl. No.: 14/893,726

(22) PCT Filed: May 23, 2014

(86) PCT No.: PCT/EP2014/060614  
§ 371 (c)(1),  
(2) Date: Nov. 24, 2015

(87) PCT Pub. No.: WO2014/191305  
PCT Pub. Date: Dec. 4, 2014

(65) Prior Publication Data  
US 2016/0132110 A1 May 12, 2016

(30) Foreign Application Priority Data  
May 29, 2013 (FR) ..................................... 13 54848

(51) Int. Cl.  
*G08C 19/22* (2006.01)  
*G06F 3/01* (2006.01)  
(Continued)

(52) U.S. Cl.  
CPC .............. *G06F 3/014* (2013.01); *B07C 7/005* (2013.01); *B07C 7/04* (2013.01); *G01S 5/02* (2013.01);  
(Continued)

(58) Field of Classification Search  
CPC .......... G06F 3/014; G06F 3/017; G06F 1/163; G06F 3/016; G06F 3/011; G06F 2203/0331; G06F 3/03547; G06F 2203/0383  
See application file for complete search history.

(56) References Cited

U.S. PATENT DOCUMENTS 4,988,981 A * 1/1991 Zimmerman ......... A61B 5/1114  
345/156  
5,514,861 A * 5/1996 Swartz .................... G06F 1/163  
235/462.44  
(Continued)

FOREIGN PATENT DOCUMENTS

EP 1860041 A1 11/2007  
EP 2127763 A1 12/2009

OTHER PUBLICATIONS

International Search Report for Application No. PCT/EP2014/060614 dated Jan. 16, 2015.

*Primary Examiner* — Joseph Feild  
*Assistant Examiner* — Rufus Point  
(74) *Attorney, Agent, or Firm* — Lerner, David, Littenberg, Krumholz & Mentlik, LLP

(57) ABSTRACT

The invention concerns a device for detecting the handling of at least one object, the device including a deformable enclosure, to which are attached at least one sensor for the detection of a grasping of objects and at least one wireless radio transmitter, the sensor being able to provide either one from among a first signal for detection of the grasping of an object and a second signal for detection of the absence of grasping of an object. The invention is characterized in that the transmitter includes first means for wireless radio transmission of a third signal, allowing determination of a localization of the enclosure towards a receiver remote from the deformable enclosure, as well as second means for (Continued)

Figure 1:
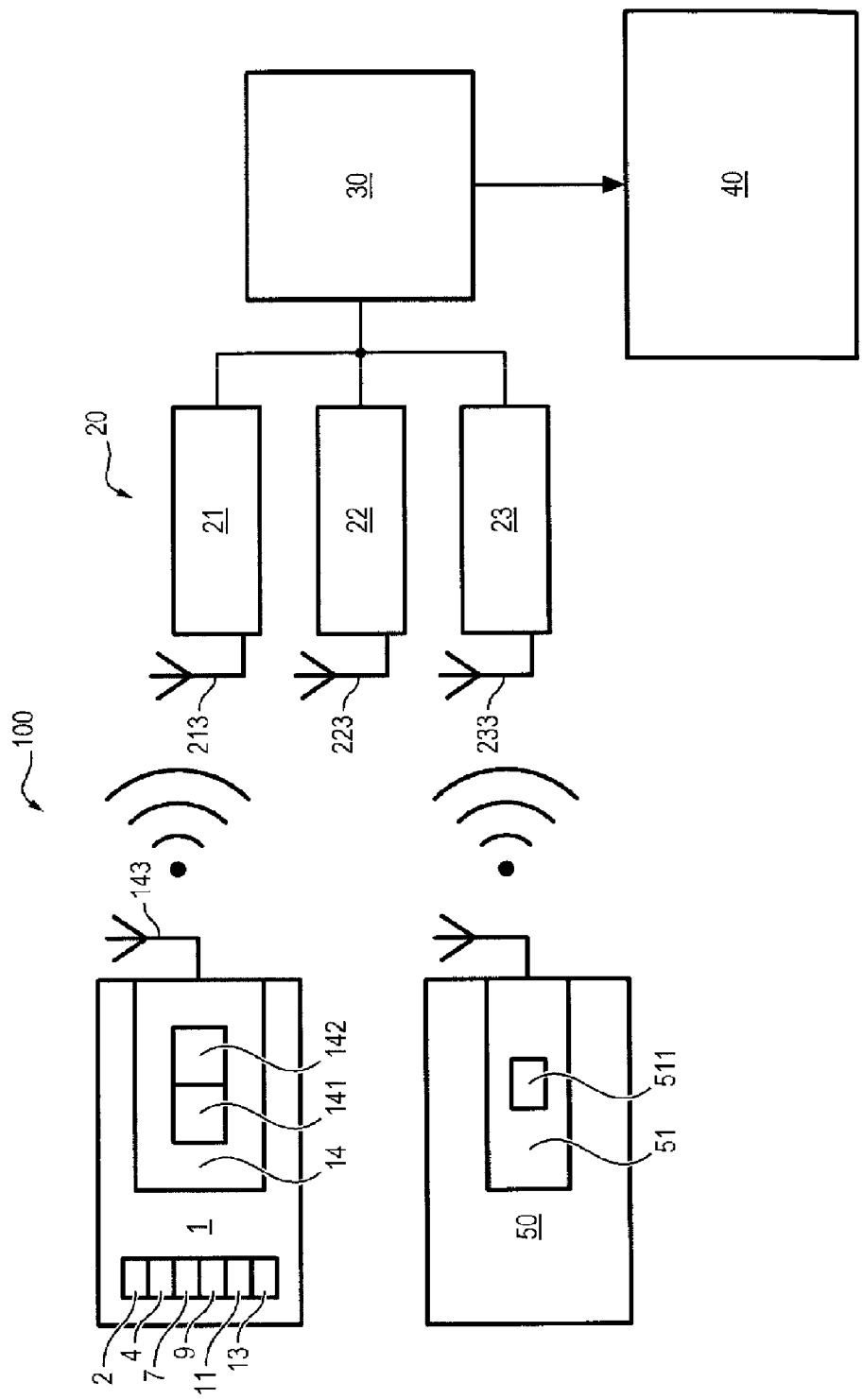

wireless radio transmission of the first or second signal towards said receiver.

17 Claims, 2 Drawing Sheets

(51) Int. Cl.
*B07C 7/00* (2006.01)
*B07C 7/04* (2006.01)
*G01S 5/02* (2010.01)
*H04Q 9/00* (2006.01)
*G06F 1/16* (2006.01)
*G06Q 50/28* (2012.01)
*G01S 13/74* (2006.01)

(52) U.S. Cl.
CPC ............... *H04Q 9/00* (2013.01); *G01S 13/74* (2013.01); *G06F 1/163* (2013.01); *G06F 3/016* (2013.01); *G06F 3/017* (2013.01); *G06F 2203/0331* (2013.01); *G06Q 50/28* (2013.01); *H04Q 2209/47* (2013.01)

(56) References Cited

U.S. PATENT DOCUMENTS

| | | | | |
|---|---|---|---|---|
| 7,504,949 B1* | 3/2009 | Rouaix | ............... | G06Q 10/06 235/375 |
| 7,845,225 B2* | 12/2010 | Ridenour | ............... | A61B 5/225 73/379.02 |
| 8,279,091 B1* | 10/2012 | Tran | ............... | G06F 3/017 340/4.1 |
| 8,306,638 B2* | 11/2012 | Jung | ............... | G09F 9/30 340/524 |
| 9,120,220 B2* | 9/2015 | Bergelin | ............... | B25J 9/0006 |
| 9,171,437 B2* | 10/2015 | Nakamura | ............... | G06F 3/016 |
| 9,230,250 B1* | 1/2016 | Parker | ............... | G06Q 20/203 |
| 9,235,740 B1* | 1/2016 | Graybill | ............... | G06K 7/10366 |
| 9,417,693 B2* | 8/2016 | Seth | ............... | G06F 3/017 |
| 2002/0130844 A1 | 9/2002 | Natoli | | |
| 2004/0100376 A1* | 5/2004 | Lye | ............... | A61B 5/411 340/539.12 |
| 2007/0046498 A1* | 3/2007 | K.Y. Jung | ............... | G09F 9/30 340/853.1 |
| 2007/0288104 A1 | 12/2007 | Yamauchi et al. | | |
| 2008/0189827 A1* | 8/2008 | Bauer | ............... | A61B 5/225 2/161.2 |
| 2008/0318625 A1* | 12/2008 | Rofougaran | ............... | G01S 7/412 455/556.1 |
| 2009/0199636 A1* | 8/2009 | Ridenour | ............... | A61B 5/225 73/379.02 |
| 2009/0224040 A1 | 9/2009 | Kushida et al. | | |
| 2009/0261988 A1* | 10/2009 | Ramirez Serrano | ............... | G07C 9/00182 340/932.2 |
| 2010/0097195 A1 | 4/2010 | Majoros et al. | | |
| 2010/0234182 A1* | 9/2010 | Hoffman | ............... | A61B 5/1125 482/8 |
| 2011/0251865 A1* | 10/2011 | Yuen | ............... | G06Q 10/06 705/7.11 |
| 2013/0138246 A1* | 5/2013 | Gutmann | ............... | G05D 1/0231 700/253 |
| 2013/0218456 A1* | 8/2013 | Zelek | ............... | G01C 21/3652 701/412 |
| 2013/0226350 A1* | 8/2013 | Bergelin | ............... | B25J 9/0006 700/275 |
| 2013/0317648 A1* | 11/2013 | Assad | ............... | B25J 9/1694 700/258 |
| 2014/0139422 A1* | 5/2014 | Mistry | ............... | G06F 3/014 345/156 |
| 2016/0132110 A1* | 5/2016 | Mutz | ............... | B07C 7/005 340/870.07 |
| 2016/0162022 A1* | 6/2016 | Seth | ............... | G06F 3/014 345/156 |
| 2016/0299570 A1* | 10/2016 | Davydov | ............... | G06F 1/163 |
| 2016/0313801 A1* | 10/2016 | Wagner | ............... | G06F 3/017 |

* cited by examiner

DEVICE AND METHOD FOR DETECTING THE HANDLING OF AT LEAST ONE OBJECT

CROSS REFERENCE TO RELATED APPLICATIONS

The present application is a national phase entry under 35 U.S.C. § 371 of International Application No. PCT/EP2014/060614, filed on May 23, 2014, published in French, which claims priority from French Patent Application No. 1354848, filed May 29, 2013, the disclosures of which are incorporated by reference herein.

The invention relates to a device and to a method for detecting the handling of at least one object.

A field of application of the invention is logistics and relates to shops or warehouses where objects are stored, for example intended to be sold or delivered.

In this field, the "picking" activity, i.e. the picking up of objects and more generally the handling of objects (storage of articles in racks, picking up the articles, sorting the articles, managing inventories by computer, managing arrivals by computer, managing deliveries by computer, for example) is of a crucial importance. This segment of logistics operates with extremely reduced margins. The productivity and the reliability of these operations are critical, since the slightest error perturbs the system and requires costly interventions, without including the discontent of the customer. Today, the picking activity of an article is essentially a manual operation. A person (operator) receives a list of products to collect in order to produce a packet for example. This person picks up the products and records the operation by reading a bar code, as this is known. These handling operations are time consuming.

Thus, for each element of a purchase order, an operator has to manually pick up the adequate number of products in the inventory. He/she has to record this operation, and then place the products in a corresponding container (typically a collection bin). For optimization issues, it is frequent that an operator processes several orders simultaneously. In this case, the products corresponding to a given order have to be put into the right collection bin.

Many systems have been developed for facilitating the tracking of these operations and reducing the number of errors. They use technologies of the bar code or RFID type for identifying the products and/or the collection bins.

In technologies of the bar code type, the user has to scan the bar code present on each article by means of a tool for optically reading bar codes.

Document US-A-2007/288104 describes a device according the preamble of claim 1, and this for determining on which side an object is held by a glove or by a grasping means.

This document actually provides transmitting means mounted on one of an object to be grasped and grasping means, such as a glove, and receiving means mounted on the other of the object to be grasped and the grasping means. A position identification information is transmitted from the transmission means to the receiving means. The position identification information is an information for identifying the position in which the transmission means is mounted. A pressure sensor for detecting the magnitude or presence of pressure when the object is held by the grasping means, is attached to this grasping means.

According to this document, in the cases when the transmission means are mounted on the object which has to be grasped and are formed with RFID tags and when the receiving means are mounted on the glove and formed by another RFID tag, each RFID tag attached to the object transmits to the other RFID antenna attached to the glove a pair consisting of an object identifier for indicating the type of object which has to be grasped, as well as the number and the positions in which the RFID tag of the object is mounted. The manner, in which the object is grasped by the glove, or the grasped state, is estimated in a judging unit of a computer from the object identifier, from the identifiers of position and from the magnitude or presence of pressure, detected by the sensor. When the object is held by the glove, a content corresponding to the manner in which the object is grasped, may be provided and used in educational material or toys.

Document US-A-2010/00 97 195 uses an RFID technology using a glove provided with a reader of RFID tags present on the articles. The glove is provided with an activation component which has to be pressed against a surface for activating reading by the reader. The RFID reader of the glove then sends a query signal to an RFID tag associated with an object. A screen displays the information received from the RFID tags in response to the query signal.

Document EP-A-2 127 163 describes a system for handling objects, wherein a person is provided with an antenna unit capable of activating an RFID tag present on a machine for sorting objects, as soon as a sensor borne by a glove of the user generates a signal indicating that the operator is grasping the object.

This document thus describes a device for detecting the handling of at least one object, the device including a deformable enclosure, which is intended to be slipped around the hand of a user and to which are attached at least one sensor of the grasping of objects and at least one wireless radio transmitter, the sensor being able to provide either one from among a first object grasping detection signal and a second signal detecting the absence of grasping of an object.

These known systems have the drawback of having to scan objects or articles or having to send query signals to a machine bound to the object, which involves many steps. The operation consisting of scanning is a one-off operation and does not exclude possible errors due to the human factor (inadvertence, tiredness for example).

The invention is directed to obtaining a method and a device for detecting the handling of at least one object, which improve existing devices, avoid operations for reading articles or objects and find a remedy to this drawback, while improving the productivity of the picking operation and controlling its quality.

For this purpose, a first subject matter of the invention is a device for detecting the handling of at least one object, the device including a deformable enclosure, which is intended to be slipped around the hand, a portion of the hand or a portion of the arm of a user, and to which are attached at least one sensor for the detection of a grasping of objects and at least one wireless radio transmitter intended for transmitting towards at least one receiver remote from the deformable enclosure, the sensor being able to provide either one from among a first signal for detection of the grasping of an object and a second signal for detection of the absence of grasping of an object, characterized in that the transmitter includes first means for wireless radio transmission of a third signal, allowing determination of a localization of the enclosure along at least one coordinate, towards said at least one receiver remote from the deformable enclosure, as well as second means for wireless radio transmission of the first or second signal towards said at least one receiver.

Thus, the invention gives the possibility of replacing the recording operation when an operator picks up a product and places it in a bin corresponding to the order of articles by an automatic system not requiring manual scanning operations. By means of the invention, the scanning operation is thus replaced with a natural and rapid movement.

According to an embodiment, the enclosure is provided with a specific localization device (for example pulsed radio).

According to an embodiment, the enclosure is further equipped with a device (sensor) giving the possibility of determining whether the operator is either holding or not an object in his/her hand.

In an embodiment, a system for real-time localization (for example base stations) analyzes the localization of the enclosure borne by the operator and analyzes whether this operator is holding an object in his/her hand.

According to an embodiment, from this information, the system automatically counts the picking-up and return operations carried out.

According to an embodiment, the system may further check whether the object(s) has(have) been deposited in the right collection bin.

According to an embodiment, the transmitter and/or the first means for wireless radio transmission and/or the second means for wireless radio transmission are of the UWB type.

According to an embodiment, the sensor is able to provide, when the deformable enclosure is in a state for grasping an object, the first signal for detection of the grasping of an object, and is able to provide, when the deformable enclosure is not found in the state for grasping an object, the second signal for detection of the absence of grasping of an object.

According to an embodiment, the deformable enclosure comprises a glove for grasping the object.

According to an embodiment, the receiver includes at least one base station, which is connected to a localization system giving the possibility of calculating from the third signal received by the base station a localization of the object having been handled along at least one coordinate.

According to an embodiment, the localization system is connected to a data processing system for sending to the latter the localization of the object having been handled as well as the first or second signal.

According to an embodiment, the receiver includes a plurality of base stations remote from the deformable enclosure and remote from each other.

According to an embodiment, the transmitter includes third means for calculating its own localization along at least one coordinate, the third signal including said own localization as a localization of the object, the receiver being connected to a data processing system for sending to the latter the localization of the object as well as the first or second signal.

According to an embodiment, the data processing system includes:
a memory in which is recorded at least one other storage localization, which is the localization of an area for storage of said object or of a compartment for storage of said object,
and a means for automatically comparing the localization of the object having been handled with the other storage localization, in order to generate, in the case of having received the first signal for detection of the grasping of an object and when the means for automatically comparing has determined that the localization of the object was close to the other storage localization by less than a predetermined distance, an information indicating that the object was taken from the area for storage of said object or from the compartment for storage of said object.

According to an embodiment, the data processing system includes:
a memory in which is recorded at least one other storage localization, which is the localization of an area for storage of said object or of a compartment for storage of said object,
and a means for automatically comparing the localization of the object having been handled with the other storage localization, in order to generate an information indicating that the object has been put into the area for storage of said object or into the compartment for storage of said object, when both the second signal for detection of the absence of grasping of an object has been received by the data processing system and the means for automatically comparing has determined that the localization of the object was close to the other storage localization by less than a predetermined distance.

According to an embodiment, the data processing system includes:
a memory in which are recorded at least one other storage localization, which is the localization of an area for storage of said object or of a compartment for storage of said object, in association with an object identifier or an object type identifier,
and a means for automatically comparing the localization of the object having been handled with the other storage localization, in order to generate an information indicating that the object having said object identifier or object type identifier has been picked from the area for storage of said object or from the compartment for storage of said object, when both the first signal for detection of the grasping of an object has been received by the data processing system and the means for automatically comparing has determined that the localization of the object was close to the other storage localization by less than a predetermined distance.

According to an embodiment, at least one receptacle for collecting objects is provided with another means for wireless radio transmission of a fourth signal allowing determination of the localization of the receptacle towards the receiver.

According to an embodiment, the data processing system includes:
a means for automatically comparing the localization of the object having been handled with a localization of the receptacle, in order to generate an information indicating that the object having said object identifier or object type identifier has been put into the receptacle, when both the data processing system has received a transition of the first signal for detection of the grasping of an object to the second signal for detection of the absence of the grasping of objects, the means for automatically comparing has determined that the localization of the object was close to the localization of the receptacle by less than a predetermined distance, the means for automatically comparing has generated an information indicating that the object having said object identifier or object type identifier has been picked from the area for storage of said object or from the compartment for storage of said object.

According to an embodiment, the data processing system includes:
  a memory in which are recorded at least one other storage localization, which is the localization of an area for storage of said object or of a compartment for storage of said object,
  and a means for automatically comparing the localization of the object having been handled with the other storage localization and with the localization of the receptacle, in order to generate an information indicating an object handling anomaly, when both the data processing system has received a transition of the first signal for detection of the grasping of an object to the second signal for detection of the absence of grasping of objects and the means for automatically comparing has determined that the localization of the object was distant by more than a prescribed distance from the localization of the receptacle and from the other storage localization.

According to an embodiment, the first means for wireless radio transmission are able to transmit in association with the third signal an identifier associated with the user or with the deformable enclosure, and/or the second means for wireless radio transmission are able to transmit in association with the first or second signal an identifier associated with the user or with the deformable enclosure.

According to an embodiment, the receiver is fixed.

According to an embodiment, the receiver is movable.

Another subject matter of the invention is a method for detecting the handling of at least one object by means of the device as described above, wherein the sensor sends either one from among a first signal for detection of the grasping of an object and a second signal for detection of the absence of grasping of an object towards at least one receiver remote from the deformable enclosure,
  characterized in that the transmitter transmits through a wireless radio link a third signal, allowing localization of the deformable enclosure along at least one coordinate, as well as the first or second signal towards said at least one receiver remote from the deformable enclosure.

Figure 3:
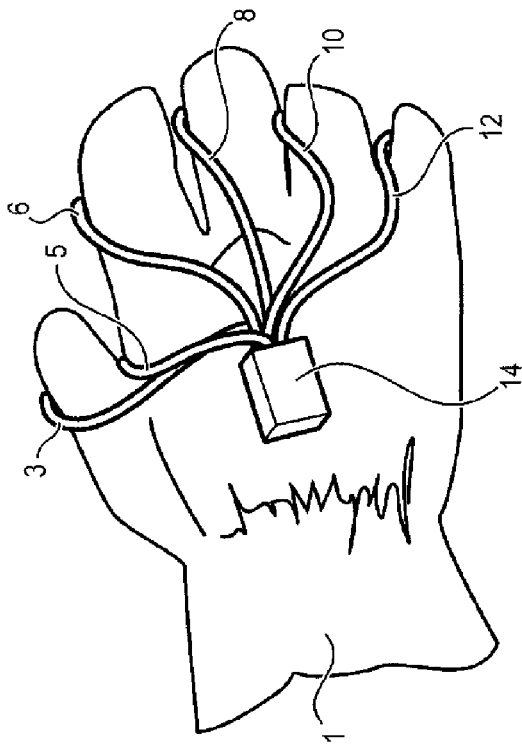
Figure 2:
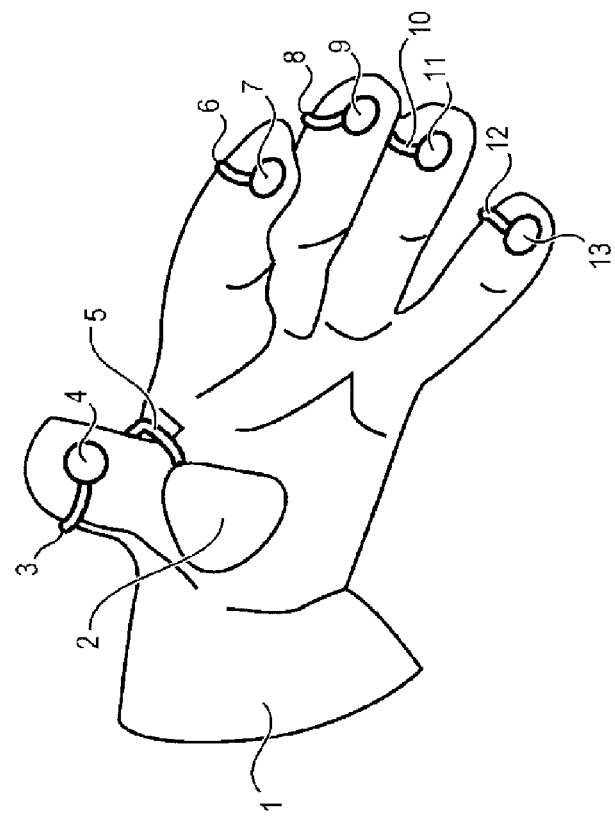

The invention will be better understood upon reading the description which follows, only given as a non-limiting example with reference to the appended drawings, wherein:

FIG. 1 is a modular block diagram showing the detection device according to an embodiment of the invention, FIG. 2 is a schematic view of a deformable enclosure according to an embodiment of the detection device according to the invention, as seen in the palm of the hand, FIG. 3 is a schematic view of the deformable enclosure of the detection device according to the embodiment of FIG. 2, as seen on the back of the hand.

In the figures, the device 100 for detecting the handling of at least one object includes a deformable enclosure 1, which is intended to be slipped around the hand, a portion of the hand or a portion of the arm of a user. At least one object grasping sensor, and for example several object grasping sensors 2, 4, 7, 9, 11, 13, are attached to the deformable enclosure 1. At least one wireless radio transmitter 14 is also attached to the deformable enclosure 1.

The sensor 2, 4, 7, 9, 11, 13 is able to provide either one selected from a first signal for detecting the grasping of an object and a second signal for detecting the absence of grasping of an object. The sending of the first signal or of the second signal by the sensor 2, 4, 7, 9, 11, 13 is received by the transmitter 14.

The deformable enclosure for example has the function of handling the object.

According to the embodiment illustrated in FIGS. 2 and 3, the deformable enclosure 1 comprises or is formed with a glove 1 for grasping the object.

The wireless radio transmitter 14 includes first means 141 for wireless radio transmission of a third signal allowing determination of the localization of the deformable enclosure 1 to at least one receiver 20 remote from the deformable enclosure 1.

In an embodiment, the receiver 20 may include a base station remote from of the deformable enclosure 1 or may include a plurality of base stations 21, 22, 23 remote from the deformable enclosure 1 and remote from each other. The transmitter 14 includes second means 142 for wireless radio transmission of the first signal or of the second signal to the receiver 20, and for example to the plurality of base stations 21, 22, 23.

In an embodiment, the receiver 20 and the base stations 21, 22, 23 are fixed and are for example positioned in a building which may for example be a warehouse, a shop or other building.

In an embodiment, the receiver 20 and the base stations 21, 22, 23 are movable, and the localization system 30 includes means for determining the localization of the base station(s) 21, 22, 23 over time, which allows determination of the localization of the transmitter 14 and/or 51.

According to an embodiment, the third localization signal is associated with the first signal and/or with the second signal.

According to an embodiment, the wireless radio transmitter 14 is for example a transmitter of the RFID type. The wireless radio transmitter 14 consists in or includes for example at least one RFID tag. In this case, the RFID transmitter is able to transmit signals to a distance of several meters as far as the receiver 20 and/or base station(s).

The transmitter 14 may in one embodiment be a transmitting beacon using pulsed radio.

In an embodiment, the first signal and/or the second signal and/or the third signal may comprise or be associated with an identifier of the enclosure 1 or of the user.

The first signal or the second signal, as well as the third signal are sent through a wireless link from the transmitter 14 to the receiver 20 and/or to the base station and/or to the base stations 21, 22, 23.

The first signal or the second signal, as well as the third signal may be sent in at least one communication frame of the transmitter 14 towards the receiver 20 and/or the base station(s) 21, 22, 23, for example in a same communication frame or in several different communication frames.

According to an embodiment, the wireless radio transmitter 14 and/or the first transmission means 141 and/or the second transmission means 142 are of the UWB type, i.e. ultra-wide band type. The transmitted signals, the transmitter 14, the first transmission means 141 and/or the second transmission means 142 are for example according to the IEEE 802.15.4a standard.

The wireless radio transmitter 14 is for example provided with one or several antennas 143. The antenna 143 is used for sending, through a wireless radio link, the signals from the transmitter 14 to the receiver 20 and/or to the base station and/or to the base stations 21, 22, 23. Provision may for example be made, as illustrated, for a single antenna 143 for both sending the third signal for localization of the first wireless transmission means 141 and the first signal or the second signal of the second wireless radio transmission means 142.

According to an embodiment, the third signal allows determination of a localization of the deformable enclosure 1 along at least one coordinate.

Thus, in an embodiment, the deformable enclosure 1 is equipped with a device (first transmission means 141) which may be localized in two or three dimensions by the base station(s) 21, 22, 23 by means of the third localization signal sent from the transmitter 14 to the base stations 21, 22, 23.

For example provision is made for at least two base stations 21, 22 distant from each other, in order to be able to localize at least in two dimensions the transmitter 14 and therefore the deformable enclosure 1. For example provision is made for at least three base stations 21, 22, 23, which are provided in for example non-aligned positions, so as to be able to localize in three dimensions the transmitter 14 and therefore the deformable enclosure 1.

Provision may also be made for a single base station 21, for example including a system for measuring the arrival angle of the third signal.

According to an embodiment, the base station(s) 21, 22, 23 are connected to a localization system 30 giving the possibility of calculating, from the third localization signal received by the base station(s) 21, 22, 23, the localization of the deformable enclosure 1, i.e. its coordinates. The base station(s) 21, 22, 23 send to the localization system 30 the first signal for detecting the grasping of objects or the second signal for detecting the absence of grasping of objects, as well as the localization of the deformable enclosure 1. The base station(s) 21, 22, 23 and the localization system 30 for example are part of a real time localization RTLS system.

Thus, the localization of the object having been handled is calculated from the third signal.

In another embodiment, the transmitter 14 includes third means for calculating its own localization, the third signal including this own localization as the localization of the object, the receiver 20 being connected to a data processing system 40 for sending to the latter the localization of the object as well as the first or second signal. In this embodiment, the third calculation means of the transmitter 14 for example calculate the localization of this transmitter 14 relatively to beacons transmitting a fifth signal received by a receiving means of the transmitter 14.

In an embodiment, at least one receptacle 50 for collecting objects (for example a bin or other container) is provided with another means 511 for wireless radio transmission of a fourth signal allowing determination of the localization of the receptacle 50 to the receiver 20 and/or to the base station(s) 21, 22, 23. The base station(s) 21, 22, 23 is(are) connected to a localization system 30 allowing calculation from the fourth signal received by the base station(s) 21, 22, 23, of the localization of the receptacle, the localization system 30 being connected to the data processing system 40 so as to send to the latter the localization of the receptacle. The bin 50 for collecting objects or receptacle 50 for collecting objects is also provided with a wireless radio transmitter 51 including means 511 for wireless radio transmission of the fourth signal to the base station(s) 21, 22, 23, these transmission means 511 being analogous to the first transmission means 141. This bin 50 or receptacle 50 is for example movable and includes displacement means relatively to an area for storage of the object(s).

Of course, in another embodiment, the transmitter 51 may include third means for calculating its own localization, the fourth signal including this specific localization as the localization of the receptacle, the receiver 20 being connected to the data processing system 40 for sending to the latter the localization of the receptacle. In this embodiment, the third computing means of the transmitter 51 for example compute the localization of this transmitter 14 relatively to beacons transmitting a fifth signal received by a receiving means of the transmitter 51.

In FIG. 2, in an embodiment, the deformable enclosure 1 is formed with a glove 1 including at the end and inside each finger of the glove different sensors, 4, 7, 9, 11, 13 respectively and for example also a sensor 2 located on the glove on the palm of the hand. Of course, a single one or several of these sensors 2, 4, 7, 9, 11, 13 may be provided. The sensor(s) 2, 4, 7, 9, 11, 13 is(are) for example pressure sensors transmitting the first signal for detecting the grasping of objects when a pressure above a determined threshold is exerted on these sensor(s). Each sensor 2, 4, 7, 9, 11, 13 is respectively connected through a respective connection 3, 6, 8, 10, 12 to the wireless radio transmitter 14, this connection 3, 6, 8, 10, 12 for example being a wired connection. The wireless radio transmitter 14 is for example provided on the back of the glove. Each sensor 2, 4, 7, 9, 11, 13 provides the second signal for detecting the absence of grasping of objects, when a pressure below said determined threshold is exerted on the latter. The second signal for detecting the absence of grasping of objects may be formed by the absence of the first signal for detecting the grasping of objects. That is to say that, in the latter case, the sensor 2, 4, 7, 9, 11, 13 does not transmit any signal.

According to an embodiment, the sensor 2, 4, 7, 9, 11, 13 is able to provide, when the deformable enclosure 1 is in a object grasping state, the first signal for detecting the grasping of objects, and is able to provide, when the deformable enclosure 1 is not in an object grasping state, the second signal for detecting the absence of grasping of objects.

In another embodiment, the sensor(s) may be sensor(s) for detecting of the deformation of the enclosure 1.

In another embodiment, the sensor(s) may be sensor(s) for detecting of the muscular activity of the hand, of the portion of the hand or of the portion of the arm of the user around which the deformable enclosure 1 is slipped on.

Each base station 21, 22, 23 and/or each receiver 20 are also provided with at least one antenna 213, 223, 233 allowing reception of the signals transmitted by the transmitter 14 or 51.

In an embodiment, the localization system 30 is connected to a data processing system 40. According to an embodiment, the data processing system 40 gives the possibility of connecting the localization of the deformable enclosure 1 with an area for storage of the object or of the objects. This data processing system 40 is for example a system for managing storage of the object(s). This data processing system 40 receives from the localization system 30 the localization of the deformable enclosure 1 and/or the localization of the collection bin 50, as well as the first signal for detecting the grasping of objects or the second signal for detecting the absence of grasping of objects, having been sent by the localization system 30.

In an exemplary application, the data processing system 40 deducts an object from the inventory of objects when it receives the first signal for detecting the grasping of objects and the localization of the enclosure 1 indicating that this localization is found in a storage localization of this object (for example a storage compartment of the object or a storage bin of the object), which was recorded beforehand in the data processing system 40. In an embodiment, the data processing system 40 includes:

a memory in which is recorded at least one other storage localization, which is the localization of an area for storage of said object or of a compartment for storage of said object, and a means for automatically comparing the localization of the object having been handled with the other storage localization, in order to generate, in the case of a first signal for detecting the grasping of object having been received and when the automatic comparison means has determined that the localization of the object was close to the other storage localization by less than a predetermined distance, an information indicating that the object was taken from the area for storage of said object or from the compartment for storage of said object.

In another exemplary application, the data processing system 40 adds an object into the inventory of objects when it receives the second signal detecting the absence of the grasping of objects and the localization of the enclosure 1 indicating that this localization is found in a storage localization of this object (for example a storage compartment of the object or a storage bin of the object), which was recorded beforehand in the data processing system 40. In an embodiment, the data processing system 40 includes:

a memory in which is recorded at least one other storage localization, which is the localization of an area for storage of said object or of a compartment for storage of said object, and a means for automatically comparing the localization of the object having been handled with the other storage localization, in order to generate an information indicating that the object has been put into the area for storage of said object or into the compartment for storage of said object, when both the second signal for detecting the absence of grasping of an object has been received by the data processing system (40) and the automatic comparison means has determined that the localization of the object was close to the other storage localization by less than a predetermined distance.

This embodiment may also be used for putting an object back into the inventory.

In another exemplary application, the localization of the deformable enclosure 1 having been calculated, may be used for identifying the object having been picked, when the localization of the enclosure 1 having been calculated, is close to a storage localization (for example a storage compartment of the object or a storage bin of the object) of this object, which was recorded beforehand in the data processing system 40. In an embodiment, the data processing system 40 includes:

a memory in which are recorded at least one other storage localization which is the localization of an area for storage of said object or of a compartment for storage of said object, in association with an identifier of the object or of a type of the object, and a means for automatically comparing the localization of the object having been handled with the other storage localization, in order to generate an information indicating that the object having said object or object type identifier has been picked from the area for storage of said object or of the compartment for storage of said object, when both the signal for detecting the grasping of an object has been received by the data processing system 40 and the automatic comparison means has determined that the localization of the object was close to the other storage localization by less than a predetermined distance.

In this exemplary application, the data processing system 40 may compare the object having been thereby identified, the object picking command (which is the instruction on the object which has to be picked) and the collection bin 50 in which the object is deposited. It is detected that an object has been deposited in a collection bin 50 when the data processing system 40 has received the transition of the first signal for detecting the grasping of objects to a second signal for detecting the absence of grasping of objects and when the localization of the deformable enclosure 1 having been calculated, is close to the localization of the collection bin 50 which has been calculated (from the transmitter 51). In an embodiment, the data processing system 40 includes:

a means for automatically comparing the localization of the object having been handled with the localization of the receptacle, in order to generate an information indicating that the object having said object identifier or object type identifier has been put into the receptacle, when both the data processing system 40 has received a transition of the first signal for detecting the grasping of an object to the second signal detecting the absence of grasping of objects, the automatic comparison means has determined that the localization of the object was close to the localization of the receptacle by less than a predetermined distance, the automatic comparison means has generated an information indicating that the object having the object identifier or object type identifier has been picked from the area for storage of said object or from the compartment for storage of said object.

Further, the device may detect handling anomalies (for example objects released between the area for storage of the product and the collection bins). The system may also detect rough handlings or objects released too far from the bins. In an embodiment, the data processing system (40) includes:

a memory in which is recorded at least one other storage localization, which is the localization of an area for storage of said object or of a compartment for storage of said object, and a means for automatically comparing the localization of the object having been handled with the other storage localization and with the localization of the receptacle, in order to generate an information indicating a handling anomaly of the object, when both the data processing system (40) has received a transition of the first signal for detecting the grasping of an object to the second signal for detecting the absence of grasping of objects and the automatic comparison means has determined that the localization of the object was distant by more than a predetermined distance from the localization of the receptacle and from the other storage localization.

In another embodiment, the user is provided with an enclosure 1 for each arm or each hand, which for example gives the possibility of determining whether the user has taken two objects simultaneously, i.e. an object in each hand.

The identifier is for example unique to the deformable enclosure 1, which allows its identification. This identifier is for example sent with the localizations and the signals sent by the localization system 30 to the data processing system 40. Thus, each user provided with the deformable enclosure may be localized individually and the processing operations may be accomplished for each user.

Thus, the invention replaces the detection of the objects by the localization of the deformable enclosure 1, thereby avoiding every time the requirement of reading a label on the handled objects, which provides a gain in time for the person handling the objects, as well as a gain in time for processing the data.

The invention claimed is:

1. A device for detecting the handling of at least one object, the device including a deformable enclosure, which is intended to be slipped around the hand, a portion of the hand or a portion of the arm of a user, and to which are attached at least one sensor for the detection of a grasping of objects and at least one wireless radio transmitter intended for transmitting towards at least one receiver remote from the deformable enclosure, the sensor being able to provide either one from among a first signal for detection of the grasping of an object and a second signal for detection of the absence of grasping of an object, wherein the transmitter includes first means for wireless radio transmission of a third signal towards said at least one receiver remote from the deformable enclosure, as well as second means for wireless radio transmission of the first or second signal towards said at least one receiver, wherein the receiver includes at least one base station, which is connected to a localization system remote from the deformable enclosure and calculating from the third signal received by the base station a localization of the deformable enclosure along at least one coordinate.

2. The device according to claim 1, wherein the transmitter and/or the first means for wireless radio transmission and/or the second means for wireless radio transmission are of the UWB type.

3. The device according to claim 1, wherein the sensor is able to provide, when the deformable enclosure is in a state for grasping an object, the first signal for detection of the grasping of an object, and is able to provide, when the deformable enclosure is not found in the state for grasping an object, the second signal for detection of the absence of grasping of an object.

4. The device according to claim 1, wherein the deformable enclosure comprises a glove for grasping the object.

5. The device according to claim 1, wherein the localization system is connected to a data processing system for sending to the latter the localization of the deformable enclosure as well as the first or second signal.

6. The device according to claim 1, wherein the receiver includes a plurality of base stations remote from the deformable enclosure and remote from each other.

7. The device according to claim 5, wherein the data processing system includes:

a memory in which is recorded at least one other storage localization, which is the localization of an area for storage of said object or of a compartment for storage of said object, and a means for automatically comparing the localization of deformable enclosure with the other storage localization, in order to generate, in the case of having received the first signal for detection of the grasping of an object and when the means for automatically comparing has determined that the localization of the deformable enclosure was close to the other storage localization by less than a predetermined distance, an information indicating that the object was taken from the area for storage of said object or from the compartment for storage of said object.

8. The device according to claim 5, wherein the data processing system includes:

a memory in which is recorded at least one other storage localization, which is the localization of an area for storage of said object or of a compartment for storage of said object, and a means for automatically comparing the localization of the deformable enclosure with the other storage localization, in order to generate an information indicating that the object has been put into the area for storage of said object or into the compartment for storage of said object, when both the second signal for detection of the absence of grasping of an object has been received by the data processing system (40) and the means for automatically comparing has determined that the localization of deformable enclosure was close to the other storage localization by less than a predetermined distance.

9. The device according to claim 5, wherein the data processing system includes:

a memory in which are recorded at least one other storage localization, which is the localization of an area for storage of said object or of a compartment for storage of said object, in association with an object identifier or an object type identifier, and a means for automatically comparing the localization of the deformable enclosure with the other storage localization, in order to generate an information indicating that the object having said object identifier or object type identifier has been picked from the area for storage of said object or from the compartment for storage of said object, when both the first signal for detection of the grasping of an object has been received by the data processing system and the means for automatically comparing has determined that the localization of the deformable enclosure was close to the other storage localization by less than a predetermined distance.

10. The device according to claim 1, wherein at least one receptacle for collecting objects is provided with another means for wireless radio transmission of a fourth signal allowing determination of the localization of the receptacle towards the receiver.

11. The device according to claim 10, wherein the data processing system includes:

a memory in which are recorded at least one other storage localization, which is the localization of an area for storage of said object or of a compartment for storage of said object, and a means for automatically comparing the localization of the deformable enclosure with the other storage localization and with the localization of the receptacle, in order to generate an information indicating an object handling anomaly, when both the data processing system has received a transition of the first signal for detection of the grasping of an object to the second signal for detection of the absence of grasping of objects and the means for automatically comparing has determined that the localization of the deformable enclosure was distant by more than a prescribed distance from the localization of the receptacle and from the other storage localization.

12. The device according to claim 1, wherein the first means for wireless radio transmission are able to transmit in association with the third signal an identifier associated with the user or with the deformable enclosure, and/or the second means for wireless radio transmission are able to transmit in association with the first or second signal an identifier associated with the user or with the deformable enclosure.

13. The device according to claim 1, wherein the receiver is fixed.

14. The device according to claim 1, wherein the receiver is movable.

15. A method for detecting the handling of at least one object by means of the device according to claim 1, wherein the sensor sends either one from among a first signal for detection of the grasping of an object and a second signal for detection of the absence of grasping of an object towards at least one receiver remote from the deformable enclosure,
- wherein the transmitter transmits through a wireless radio link a third signal as well as the first or second signal towards said at least one receiver remote from the deformable enclosure,
- wherein a localization system connected to at least one base station of the receiver calculates from the third signal received by the base station a localization of the deformable enclosure along at least one coordinate.

16. The device according to claim 9, wherein at least one receptacle for collecting objects is provided with another means for wireless radio transmission of a fourth signal allowing determination of the localization of the receptacle towards the receiver.

17. The device according to claim 16, wherein the data processing system includes:
- a means for automatically comparing the localization of the deformable enclosure with a localization of the receptacle, in order to generate an information indicating that the object having said object identifier or object type identifier has been put into the receptacle, when both the data processing system has received a transition of the first signal for detection of the grasping of an object to the second signal for detection of the absence of the grasping of objects, the means for automatically comparing has determined that the localization of the deformable enclosure was close to the localization of the receptacle by less than a predetermined distance, the means for automatically comparing has generated an information indicating that the object having said object identifier or object type identifier has been picked from the area for storage of said object or from the compartment for storage of said object.

* * * * *